US012368852B2

United States Patent
Chen et al.

(10) Patent No.: US 12,368,852 B2
(45) Date of Patent: Jul. 22, 2025

(54) METHOD AND DEVICE FOR PICTURE ENCODING AND DECODING

(71) Applicant: InterDigital VC Holdings, Inc., Wilmington, DE (US)

(72) Inventors: Ya Chen, Rennes (FR); Tangi Poirier, Thorigné-Fouillard (FR); Karam Naser, Mouazé (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/512,263

(22) Filed: Nov. 17, 2023

(65) Prior Publication Data

US 2024/0089449 A1 Mar. 14, 2024

Related U.S. Application Data

(63) Continuation of application No. 17/295,634, filed as application No. PCT/US2019/064077 on Dec. 2, 2019, now Pat. No. 11,876,968.

(30) Foreign Application Priority Data

Dec. 5, 2018 (EP) ..................... 18306620

(51) Int. Cl.
*H04N 19/129* (2014.01)
*H04N 19/13* (2014.01)
(Continued)

(52) U.S. Cl.
CPC ........... *H04N 19/129* (2014.11); *H04N 19/13* (2014.11); *H04N 19/147* (2014.11); *H04N 19/176* (2014.11); *H04N 19/18* (2014.11)

(58) Field of Classification Search
CPC .... H04N 19/129; H04N 19/13; H04N 19/147; H04N 19/176; H04N 19/18;
(Continued)

(56) References Cited

U.S. PATENT DOCUMENTS 8,750,603 B2 * 6/2014 Bethge ................ H04N 19/126
375/240.02
9,106,913 B2 8/2015 Sole Rojals et al.
(Continued)

FOREIGN PATENT DOCUMENTS

CN 1290069 A 4/2001
CN 103718554 A 4/2014
(Continued)

OTHER PUBLICATIONS

Chuo-Ling Chang et al: "Direction-Adaptive Partitioned Block Transform for Color Image Coding", IEEE Transactions on Image Processing, IEEE Service Center, Piscataway, NJ, US, vol. 18, No. 7, Jul. 1, 2010 (Jul. 1, 2010), pp. 1740-1755, XP011304431, ISSN: 1057-7149 (Year: 2010).*

(Continued)

*Primary Examiner* — Dramos Kalapodas
(74) *Attorney, Agent, or Firm* — Condo Roccia Koptiw LLP

(57) ABSTRACT

An encoding method is presented. Transform coefficients of a block are first obtained. They are then scanned according to a scan pattern for entropy coding. The scan pattern is determined responsive to a shape of the block.

16 Claims, 7 Drawing Sheets

Diagonal

Horizontal

Vertical

(51) Int. Cl.
*H04N 19/147* (2014.01)
*H04N 19/176* (2014.01)
*H04N 19/18* (2014.01)

(58) Field of Classification Search
CPC .. H04N 19/157; H04N 19/159; H04N 19/107; H04N 19/11
See application file for complete search history.

(56) References Cited

U.S. PATENT DOCUMENTS

| | | | |
|---|---|---|---|
| 11,076,150 | B2 | 7/2021 | Ohkawa et al. |
| 2004/0125204 | A1 | 7/2004 | Yamada et al. |
| 2011/0249726 | A1 | 10/2011 | Nguyen et al. |
| 2012/0170649 | A1* | 7/2012 | Chen ............... H04N 19/122 375/240.18 |
| 2015/0222893 | A1 | 8/2015 | Oh et al. |
| 2017/0064335 | A1 | 3/2017 | Na et al. |
| 2018/0262777 | A1* | 9/2018 | Filippov ............. H04N 19/60 |
| 2019/0007705 | A1* | 1/2019 | Zhao ................. H04N 19/61 |
| 2019/0383926 | A1 | 12/2019 | Crouch et al. |
| 2020/0068195 | A1* | 2/2020 | Yoo ................. H04N 19/117 |
| 2020/0288134 | A1 | 9/2020 | Lim et al. |
| 2020/0322635 | A1* | 10/2020 | Koo ................. H04N 19/625 |

FOREIGN PATENT DOCUMENTS

| | | |
|---|---|---|
| CN | 104717498 A | 6/2015 |
| GB | 2309613 A | 7/1997 |
| JP | 2003-204550 A | 7/2003 |
| JP | 2014-504820 A | 2/2014 |
| KR | 20180048809 A | 5/2018 |
| WO | 2013071889 A1 | 5/2013 |
| WO | 2014166381 A1 | 10/2014 |
| WO | 2017/138832 A1 | 8/2017 |
| WO | 2019/027241 A1 | 2/2019 |
| WO | 2019117402 A1 | 6/2019 |

OTHER PUBLICATIONS

Tekeli Nihat et al: "Intra-frame coding with recursive intra prediction and adapted block transforms", 2014 IEEE Visual Communications and Image Processing Conference, IEEE, Dec. 7, 2014 (Dec. 7, 2014 (Year: 2014).*
Chuo-Ling Chang et al: "Direction-Adaptive Partitioned Block Transform for Color Image Coding", IEEE Transactions on Image Processing, IEEE Service Center, Piscataway, NJ, US, vol. 18, No. 7, Jul. 1, 2010 (Jul. 1, 2010), pp. 1740-4755, XP011304431, ISSN: 1057-7149 (Year: 2010).*
Chang, et al., "Direction-Adaptive Partitioned Block Transform for Color image Coding", IEEE Transactions on Image Processing, vol. 19, No. 7, Jul. 2010, 16 pages.
Chen, Jianle et al., "Algorithm Description for Versatile Video Coding and Test Model 3 (VTM 3)", JVET-L1002-V1, Editors, Joint Video Experts Team (JVET) of ITU-T SG 16 WP 3 and ISO/IEC JTC 1/SC 29/WG 11, 12th Meeting: Macao, CN, Date Saved: Dec. 3, 2018, Oct. 3-12, 2018, 37 pages.
Chiang, et al., "CE10.1: Combined and Multi-Hypothesis Prediction for Improving AMVP Mode, Skip or Merge Mode, and Intra Mode", JVET-L0100-V3, MediaTek Inc., Joint Video Experts Team (JVET) of ITU-T SG 16 WP 3 and ISO/IED JTC 1/SC 29/WG 11, 12th Meeting, Macao, China, Oct. 3, 2018, 14 pages.
ITU-T, "Reference Software for ITU-T H.265 High Efficiency Video Coding", Recommendation ITU-T H.265.2, Series H: Audiovisual and Multimedia Systems —Infrastructure of Audiovisual Services—Coding of Moving Video, Oct. 2014, 12 pages.
Kidani, et al., "CE7: Block Size Dependent Coefficient Scanning (CE7.3)", JVET-L0379 KDDI Corp. (KDDI Research, Inc.), Joint Video Experts Team (JVET) of ITU-T SG 16 WP 3 and ISO/IEC JTC 1SC 29/WE 11, 12th Meeting: Macao, CN, Oct. 3-12, 2018, 5 pages.
Liao, et al., "CE10.3.1. b: Triangular Prediction Unit Mode", JVET-L0124-V2, Joint Video Exploration Team (JVET) of ITU-T SG16 WP3 and ISO/IEC JTC 1/SC 29WG11, 12 Meeting: Macao, China, Oct. 3-12, 2018, 8 pages.
Seregin, et al., "Low-Complexity Adaptive Coefficient Scanning", JCTVC-C205 Samsung Electronics Co., Ltd, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 4 pages.
Tekeli, et al., "Intra-frame Coding with Recursive Intra Prediction and Adapted Block Transforms", IEEE Visual: Communications and Image Processing Conference, Valletta, Malta, Dec. 7, 2014, 4 pages.
Zhao, et al., "Enhanced Multiple Transform for Video Coding", Institute of Electrical and Electronics Engineers (IEEE), 2016 Data Compression Conference (DCC), Snowbird, Utah, Mar. 30, 2016, 10 pages.
Zheng, et al., "CE11: Mode Dependent Coefficient Scanning", JCT-VC of ITU-T SG16 WP3 and ISO/IEC JTC1/SC29.WG11; 4th Meeting: Daegu, KR; JCTVC-D393, Jan. 20-28, 2011, 6 pages.

* cited by examiner

METHOD AND DEVICE FOR PICTURE ENCODING AND DECODING

CROSS-REFERENCE TO RELATED APPLICATIONS

This application is a continuation of U.S. patent application Ser. No. 17/295,634 (now U.S. Pat. No. 11,876,968), which is the National Stage Entry under 35 U.S.C. § 371 of Patent Cooperation Treaty Application No. PCT/US2019/064077, which claims priority from European Patent Application No. 18306620.8, filed Dec. 5, 2018, the contents of each of which are hereby incorporated by reference herein in their entireties.

TECHNICAL FIELD

At least one of the present embodiments generally relates to a method and a device for picture encoding and decoding, and more particularly, to a method and a device for picture encoding and decoding wherein quantized transform coefficients are scanned according to a scan pattern for being entropy coded and decoded.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors, prediction residuals or predictor, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

SUMMARY

According to a general aspect of at least one embodiment, a decoding method is presented, comprising: entropy decoding transform coefficients of a block scanned according to a scan pattern wherein the scan pattern is determined responsive to a shape of said block.

According to a general aspect of at least one embodiment, a decoding method is presented, comprising: entropy decoding transform coefficients of a block scanned according to a scan pattern wherein in the case where said block is a multi-hypothesis intra-inter prediction block, vertical scanning is applied and in the case where the intra prediction mode is horizontal and horizontal scanning is applied in the case where the intra prediction mode is vertical.

According to a general aspect of at least one embodiment, a decoding method is presented, comprising: entropy decoding transform coefficients of a block scanned according to a scan pattern wherein in the case where said block is triangular prediction block, the coefficients are scanned according to a scan pattern selected by an exhaustive rate-distortion search among a set of patterns and wherein the selected scan pattern is encoded.

According to a general aspect of at least one embodiment, a decoding method is presented, comprising: entropy decoding transform coefficients of a block scanned according to a scan pattern wherein the scan pattern is determined responsive to a type of inverse transform used for inverse transforming said coefficients, wherein the type of a transform is defined by its low frequency basis function being constant, increasing or decreasing.

According to a general aspect of at least one embodiment, an encoding method is presented, comprising: obtaining transform coefficients of a block; and—scanning said coefficients for entropy coding according to a scan pattern; wherein the scan pattern is determined responsive to a shape of said block.

According to a general aspect of at least one embodiment, an encoding method is presented, comprising: obtaining transform coefficients of a block; and—scanning said coefficients according to a scan pattern for entropy coding; wherein in the case where said block is a multi-hypothesis intra-inter prediction block, vertical scanning is applied in the case where the intra prediction mode is horizontal and horizontal scanning is applied in the case where the intra prediction mode is vertical.

According to a general aspect of at least one embodiment, an encoding method is presented, comprising: obtaining transform coefficients of a block; and—scanning said coefficients according to a scan pattern for entropy coding; wherein in the case where said block is triangular prediction block, the coefficients are scanned according to a scan pattern selected by an exhaustive rate-distortion search among a set of patterns and wherein the selected scan pattern is encoded.

According to a general aspect of at least one embodiment, an encoding method is presented, comprising: transforming residuals of a block using at least one transform to obtain transform coefficients; and—scanning said coefficients according to a scan pattern for entropy coding; wherein the scan pattern is determined responsive to a type of said transform, wherein the type of a transform is defined by its low frequency basis function being constant, increasing or decreasing.

According to a general aspect of at least one embodiment, a decoding apparatus is presented, comprising one or more processors configured to implement: entropy decoding transform coefficients of a block scanned according to a scan pattern wherein the scan pattern is determined responsive to a shape of said block.

According to a general aspect of at least one embodiment, a decoding apparatus is presented, comprising one or more processors configured to implement: entropy decoding transform coefficients of a block scanned according to a scan pattern wherein in the case where said block is a multi-hypothesis intra-inter prediction block, vertical scanning is applied and in the case where the intra prediction mode is horizontal and horizontal scanning is applied in the case where the intra prediction mode is vertical.

According to a general aspect of at least one embodiment, a decoding apparatus is presented, comprising one or more processors configured to implement: entropy decoding transform coefficients of a block scanned according to a scan pattern wherein in the case where said block is triangular prediction block, the coefficients are scanned according to a scan pattern selected by an exhaustive rate-distortion search among a set of patterns and wherein the selected scan pattern is encoded.

According to a general aspect of at least one embodiment, a decoding apparatus is presented, comprising one or more processors configured to implement: entropy decoding transform coefficients of a block scanned according to a scan pattern wherein the scan pattern is determined responsive to a type of inverse transform used for inverse transforming said coefficients, wherein the type of a transform is defined by its low frequency basis function being constant, increasing or decreasing.

According to a general aspect of at least one embodiment, an encoding apparatus is presented, comprising one or more processors configured to implement: obtaining transform coefficients of a block; and—scanning said coefficients for entropy coding according to a scan pattern; wherein the scan pattern is determined responsive to a shape of said block.

According to a general aspect of at least one embodiment, an encoding apparatus is presented, comprising one or more processors configured to implement: obtaining transform coefficients of a block; and—scanning said coefficients according to a scan pattern for entropy coding; wherein in the case where said block is a multi-hypothesis intra-inter prediction block, vertical scanning is applied in the case where the intra prediction mode is horizontal and horizontal scanning is applied in the case where the intra prediction mode is vertical.

According to a general aspect of at least one embodiment, an encoding apparatus is presented, comprising one or more processors configured to implement: obtaining transform coefficients of a block; and—scanning said coefficients according to a scan pattern for entropy coding; wherein in the case where said block is triangular prediction block, the coefficients are scanned according to a scan pattern selected by an exhaustive rate-distortion search among a set of patterns and wherein the selected scan pattern is encoded.

According to a general aspect of at least one embodiment, an encoding apparatus is presented, comprising one or more processors configured to implement: transforming residuals of a block using at least one transform to obtain transform coefficients; and—scanning said coefficients according to a scan pattern for entropy coding; wherein the scan pattern is determined responsive to a type of said transform, wherein the type of a transform is defined by its low frequency basis function being constant, increasing or decreasing.

According to another general aspect of at least one embodiment, a bitstream is formatted to include signal generated according to the encoding methods described above. One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

DETAILED DESCRIPTION

Figures 1, 2, 3:
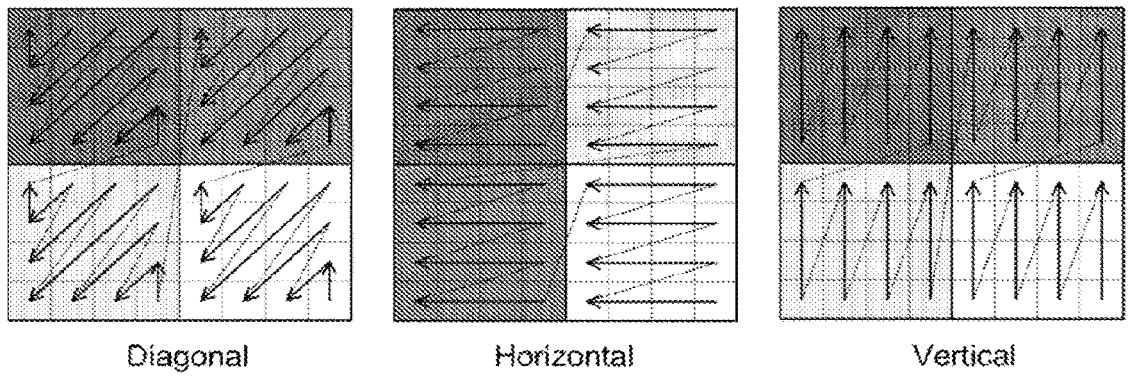
FIG. 1 depicts several scan patterns in an 8×8 block as used in HEVC.
FIGS. 2 and 3 depict decisions tables associating a scan pattern with each block's size.

In HEVC coding, a picture is partitioned into CTUs of square shape with a configurable size typically 64×64. The size may be 128×128, or 256×256 in other video coding standards. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

In the present application, the terms "scanning order" and "scan pattern" may be used interchangeably.

In the HEVC, a picture is divided into so-called Coding Tree Units (CTU), and each CTU is represented by Coding Units (CUs) in the compressed domain. Each CU is then given some Intra or Inter prediction parameters. To do so, it is spatially partitioned into one or more Prediction Units (PUs), each PU being assigned some prediction information (e.g. intra prediction mode, reference index, motion vector). The Intra or Inter coding mode is assigned on the CU level.

After the splitting, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

In HEVC, the quantized transform coefficients of a coding block are coded using non-overlapped coefficient groups (CGs). A CG contains the coefficients of a 4×4 block of a coding block. As an example, the CGs contained in an 8×8 block are illustrated on FIG. 1. The CGs inside a coding block, and the 16 transform coefficients within a CG, are scanned and coded according to a scan pattern selected among three scanning orders: diagonal, horizontal, vertical. For inter blocks, the diagonal scanning on the left of FIG. 1 is always used. FIG. 2 indicates for each intra block size the type of scan pattern to use. On this Figure, the first vertical line indicates the block height and the first horizontal line indicates the block width, D indicates that the diagonal scan pattern is used and M indicates that a Mode Dependent Coefficient Scanning (MDCS) is used. In HEVC, this mode is only used for 4×4 and 8×8 intra blocks. Thus, for 4×4 and 8×8 intra blocks, the scanning order depends on the Intra Prediction mode active for that block. MDCS is not currently implemented in VTM-3 which is the software model of VVC (Versatile Video Coding). However, a contribution JVET-L0379 to standard body proposes to use MDCS in VVC and extended it to some rectangular block sizes introduced by Quad Tree (QT)/Binary Tree (BT)/Ternary Tree (TT) split in VTM-3. QT is the splitting of a block into 4 identical sub-block. BT is the splitting of a block into two identical rectangles either by a vertical line or an horizontal line. TT is the splitting of a block into 3 identical rectangles either by two vertical lines or two horizontal lines.

In the case where MDCS is used for a 4×4 or an 8×8 block in HEVC, the scan pattern of an intra block is determined by the intra prediction mode using a fixed look-up table (LUT). The LUT of Luma blocks in HEVC is given in Table 1: vertical modes 6-14 use the horizontal scan, horizontal modes 22-30 use the vertical scan, other modes use the diagonal scan.

TABLE 1

| | Mode | | | | | | | | | | | | | | | |
|---|---|---|---|---|---|---|---|---|---|---|---|---|---|---|---|---|
| TU | 0 | 1 | 2 | 3 | 4 | 5 | 6 | 7 | 8 | 9 | 10 | 11 | 12 | 13 | 14 | 15 ... |
| 4 × 4 or 8 × 8 | D | D | D | D | D | D | H | H | H | H | H | H | H | H | H | D |

| | Mode | | | | | | | | | | | | | | | | | | |
|---|---|---|---|---|---|---|---|---|---|---|---|---|---|---|---|---|---|---|---|
| TU | ... 16 | 17 | 18 | 19 | 20 | 21 | 22 | 23 | 24 | 25 | 26 | 27 | 28 | 29 | 30 | 31 | 32 | 33 | 34 |
| 4 × 4 or 8 × 8 | D | D | D | D | D | D | V | V | V | V | V | V | V | V | V | D | D | D | D |

In JVET-L0379, the solution of FIG. 2 is modified. Another decision table is used for switching between MDCS and diagonal scanning. FIG. 3 depicts this another decision table. This table is based on a ratio of block's height and width. When the ratio between the larger dimension of a block and its smaller dimension is equal or larger than four, MDCS is applied. MDCS is also applied for blocks of size 4×4, 4×8, 8×4 and 8×8. It is noted that transform block maximum sizes are 64×64 for Luma and 32×32 for Chroma. One drawback of this solution is that the scanning order of the coefficients only depends on the intra prediction mode for intra blocks. Besides, there is no adaptive scanning order for inter blocks, i.e. inter blocks always use a diagonal scan pattern.

The entropy coding/decoding of transform coefficients comprises up to five scan passes, respectively dedicated to the coding of a syntax element in the following list:

sig_flag or significant-coeff-flag: significance of a coefficient that indicates whether a coefficient's value is equal to zero or not;

gt1_flag or coeff-abs-level-greater1-flag: indicates if the absolute value of a coefficient level is greater than 1;

gt2_flag or coeff-abs-level-greater2-flag: indicates if the absolute value of a coefficient level is greater than 2;

par_flag: indicates a parity of the coefficient when the Dependent Quantization method is used;

coeff-abs-level-remaining: remaining value for absolute value of a coefficient level (in the case where a coefficient's value is larger than that coded in previous passes;

coeff-sign-flag: sign of a significant coefficient (0: positive, 1: negative).

Each scan pass follows the scan pattern.

In each scan pass, a syntax is coded only when necessary as determined by the previous scan passes. For example, if the sig_flag of a coefficient is zero, the remaining scan passes for encoding the absolute value of that coefficient are not necessary. Same for the sign coding: the coeff-sign-flag is sent only for non-zero coefficient.

All scan passes are performed for a given CG until all the quantized coefficients in that CG can be reconstructed, before processing a next CG. Scanning starts at the last significant coefficient in the coding block, sweeps through high frequency coefficients to low frequency ones, and processes all coefficients until the DC coefficient.

The quantized transform coefficients are entropy coded to output a bitstream. As a non-limiting example, context-based adaptive binary arithmetic coding (CABAC) can be used to encode syntax elements into the bitstream. To encode with CABAC, a non-binary syntax element value is mapped to a binary sequence, called a bin string. For a bin, a context model is selected. The context model stores the probability of each bin being "1" or "0", and the context model can be adaptive or static. The static model triggers a coding engine with an equal probability for bins "0" and "1". In the adaptive coding engine, the context model is updated based on the actual coded value of a bin. The operation modes corresponding to the adaptive and static models are called the regular mode and the bypass mode, respectively.

At least one embodiment aims at improving compression efficiency compared to existing video compression systems.

A least one embodiment thus proposes to efficiently adapt the scanning order for quantized transform coefficients, in a way that provides good compression efficiency (rate distortion performance) together with a minimum complexity increase of the coding design.

At least one embodiment thus proposes some schemes to adapt scanning order for quantized transform coefficients to one or more of the block shape, prediction tool and transform type.

In the following, the term "transform coefficients" is used instead of "quantized transform coefficients" for sake of simplicity.

Energy of residual information is highly compacted into the top-left corner of the coding block after transform, which indicates that the DC coefficient and low frequency transform coefficients usually have more information and higher absolute values compared to the transform coefficients located in the high frequency regions.

A scan pattern that follows a descending order of the likelihood of coefficients being non-zero provides more accurate CABAC probability modeling. The diagonal scan arranges the 2-D transform coefficients into 1-D array according to its frequency in the descending order. However, since this single scan pattern is not adaptive to the coefficient values, there is room for improvement by employing adaptive scanning order.

Figure 4:
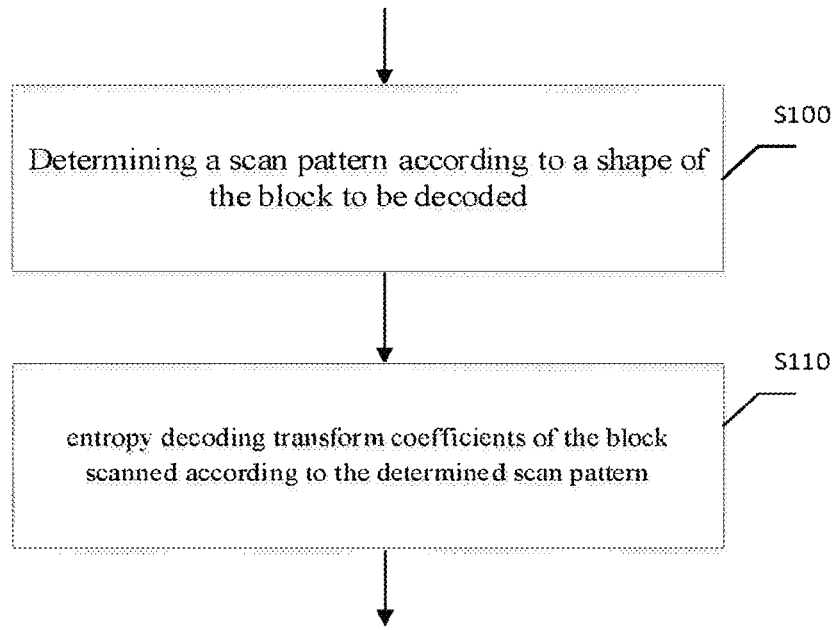
FIG. 4 is a flowchart of a decoding method according to one embodiment.

FIG. 4 depicts a flowchart of an encoding method according to one general embodiment. At S100, a scan pattern is determined according to a shape of the block to be decoded. At S110, transform coefficients of the block scanned according to the determined scan pattern are entropy decoded.

Figure 5:
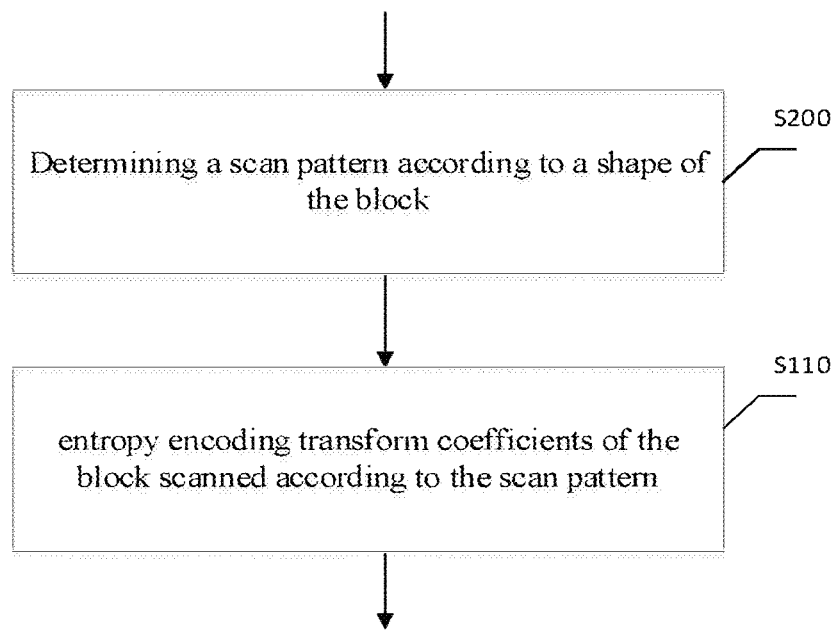
FIG. 5 is a flowchart of an encoding method according to one embodiment.

FIG. 5 depicts a flowchart of a decoding method according to one general embodiment. At S200, a scan pattern is determined according to a shape of the block to be encoded. At S110, transform coefficients of the block scanned according to the determined scan pattern are entropy encoded.

A first embodiment proposes a general adaptive scanning order scheme directly related to the block shape.

Intra prediction mode is correlated to the block shape: horizontal blocks are more likely to choose horizontal intra prediction modes. Besides, the frequency area is also correlated to the block shape. Indeed, in the case where a block is rectangular, a higher number of coefficients of zero value are located in high frequency area along the longer dimension compared to the shorter dimension. Thus, low- and high-frequency coefficients may be too much interlaced if diagonal scanning is used. Taking vertical blocks for example, along the vertical direction which is the longer dimension, more coefficients tend to be zero in high frequency area. By using coefficient scanning oriented in the horizontal direction instead of the diagonal scanning, the non-zero coefficients in the 2D matrix can be further compacted toward the beginning of the 1D vector. This in turn improves entropy coding efficiency.

According to the basic idea of the first embodiment: scanning order selection is dependent on the block shape, which can also be called "block-shape dependent coefficients scanning". For square blocks, diagonal scanning or MDCS may be applied. For rectangular blocks, adaptive scanning order is used. The shape of a rectangular block is defined by the value of its height and width and also its orientation. Therefore, a block of size 8×16 (vertical block) and a block or size 16×8 (horizontal block) are of different shape.

Figures 6A, 6B, 7:
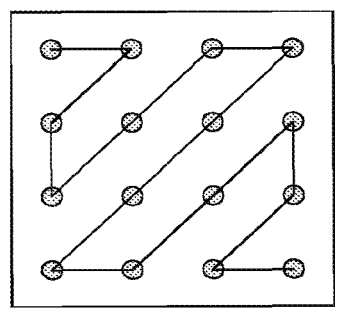
FIGS. 6A and 6B depict a decision table associating a scan pattern with each block's size according to a one embodiment.
FIG. 7 illustrates a conventional zig-zag scan in a 4×4 block.

In a first variant, vertical scanning is used with horizontal blocks while horizontal scanning is used with vertical blocks. Otherwise, only diagonal scanning or MDCS is applied. This second variant is illustrated by FIG. 6A.

In a second variant, in the case where a ratio of larger block's dimension to smaller block's dimension is equal or larger than one value T, vertical scanning is used for horizontal block and horizontal scanning is used for vertical blocks. Otherwise, only diagonal scanning or MDCS is applied. This second variant is illustrated by FIG. 6B in the case where the value T is equal to 4.

In a third variant, for rectangular blocks, the best scanning order is selected by exhaustive search among a set of scan patterns, e.g. the conventional diagonal, horizontal and vertical scan patterns. The exhaustive search may be also done among another set of scan patterns and is not limited to the above list. The best scanning order for a rectangular block is selected based on Rate Distortion (RD) estimation and signaled to a decoder by encoding an additional syntax element tu_coeffscan_type. Therefore, the scan pattern that provides the best rate-distortion compromise is selected among the set of scan patterns. In other cases, only diagonal scanning or MDCS is applied.

In a fourth variant, in the case where a ratio of larger block's dimension to smaller block's dimension is equal or larger than one value T, the best scanning order is selected by exhaustive search among a set of scan patterns, e.g. the conventional diagonal, horizontal and vertical scan patterns. The exhaustive search may be also done among another set of scan patterns and is not limited to the above list. The best scanning order for a block is selected based on RD estimation and signaled to a decoder by encoding the additional syntax element tu_coeffscan_type as indicated in the syntax Table. In other cases, only diagonal scanning or MDCS is applied.

As indicated for variants three and four, an additional syntax element is encoded/decoded. Details are given in the following syntax table of how to signal the best scanning order type selected by exhaustive search among the diagonal, horizontal and vertical scan patterns based on RD estimation. The specific signalling is indicated in italics.

| | Descriptor |
|---|---|
| transform_unit( x0, y0, tbWidth, tbHeight, treeType ) { | |
|   if( treeType = = SINGLE_TREE \|\| treeType = = DUAL_TREE_LUMA ) | |
|     tu_cbf_luma[ x0 ][ y0 ] | ae(v) |
|   if( treeType = = SINGLE_TREE \|\| treeType = = DUAL_TREE_CHROMA ) { | |
|     tu_cbf_cb[ x0 ][ y0 ] | ae(v) |
|     tu_cbf_cr[ x0 ][ y0 ] | ae(v) |
|   } | |

|  | Descriptor |
|---|---|
| if( tu_cbf_luma[ x0 ][ y0 ] \|\| tu_cbf_cb[ x0 ][ y0 ] \|\| tu_cbf_cr[ x0 ][ y0 ] ) && | |
|   treeType != DUAL_TREE_CHROMA ) { | |
|   if( cu_qp_delta_enabled_flag && | |
|   !IsCuQpDeltaCoded ) { | |
|     cu_qp_delta_abs | ae(v) |
|     if( cu_qp_delta_abs ) | |
|       cu_qp_delta_sign_flag | ae(v) |
|   } | |
| } | |
| if( ( ( ( CuPredMode[ x0 ][ y0 ] = = MODE_INTRA ) | |
| && sps_mts_intra_enabled_flag ) \|\| | |
|   ( ( CuPredMode[ x0 ][ y0 ] = = MODE_INTER ) | |
| && sps_mts_inter_enabled_flag ) ) | |
| && tu_cbf_luma[ x0 ][ y0 ] && treeType != | |
| DUAL_TREE_CHROMA | |
| && ( tbWidth <= 32 ) && ( tbHeight <= 32 ) ) | |
|   tu_mts_flag[ x0 ][ y0 ] | ae(v) |
|   *tu_coeffscan_type* | ae(v) |
| if( tu_cbf_luma[ x0 ][ y0 ] ) | |
|   residual_coding( x0, y0, log2( tbWidth ), | |
|   log2( tbHeight), 0, *tu_coeffscan_type*) | |
| if( tu_cbf_cb[ x0 ][ y0 ] ) | |
|   residual_coding( x0, y0, log2( tbWidth / 2 ), | |
|   log2( tbHeight / 2 ), 1, *tu_coeffscan_type*) | |
| if( tu_cbf_cr[ x0 ][ y0 ] ) | |
|   residual_coding( x0, y0, log2( tbWidth / 2 ), | |
|   log2( tbHeight / 2 ), 2, *tu_coeffscan_type*) | |
| } | |

|  | Descriptor |
|---|---|
| residual_coding( x0, y0, log2TbWidth, log2TbHeight, cIdx, *CoeffScanType* ) { | |
|   if( transform_skip_enabled_flag && ( cIdx ! = 0 \|\| tu_mts_flag[ x0 ][ y0 ] = = 0 ) && | |
|   ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   lastSubBlock = ( 1 << ( log2TbWidth + log2TbHeight − 2 * log2SbSize ) ) − 1 | |
|   ScanOrder = getScanOrder ( *CoeffScanType* ) | |
|   do { | |
|     if( lastScanPos = = 0 ) { | |
|       lastScanPos = numSbCoeff | |
|       lastSubBlock− − | |
|     } | |
|     lastScanPos− − | |
|     xS = ScanOrder[ log2TbWidth − log2SbSize ] | |
|     [ log2TbHeight − log2SbSize ] | |
|         [ lastSubBlock ][ 0 ] | |
|     yS = ScanOrder [ log2TbWidth − log2SbSize ] | |
|     [ log2TbHeight − log2SbSize ] | |
|         [ lastSubBlock ][ 1 ] | |
|     xC = ( xS << log2SbSize ) + | |
|       ScanOrder [ log2SbSize ][ log2SbSize ] | |
|       [ lastScanPos ][ 0 ] | |
|     yC = ( yS << log2SbSize ) + | |
|       ScanOrder [ log2SbSize ][ log2SbSize ] | |
|       [ lastScanPos ][ 1 ] | |
|   } while( ( xC != LastSignificantCoeffX ) \|\| | |
| ( yC != LastSignificantCoeffY ) ) | |
|   numSigCoeff = 0 | |
|   QState = 0 | |
| for( i = lastSubBlock; i >= 0; i− − ) { | |
|   startQStateSb = QState | |
|   xS = ScanOrder [ log2TbWidth − log2SbSize ] | |
|   [ log2TbHeight − log2SbSize ] | |
|         [ lastSubBlock ][ 0 ] | |
|   yS = ScanOrder [ log2TbWidth − log2SbSize ] | |
|   [ log2TbHeight − log2SbSize ] | |
|         [ lastSubBlock ][ 1 ] | |
|   inferSbDcSigCoeffFlag = 0 | |
|   if( ( i < lastSubBlock ) && ( i > 0 ) ) { | |
|     coded_sub_block_flag[ xS ][ yS ] | ae(v) |
|     inferSbDcSigCoeffFlag = 1 | |
|   } | |
|   firstSigScanPosSb = numSbCoeff | |
|   lastSigScanPosSb = −1 | |
|   for( n = ( i = = lastSubBlock ) ? lastScanPos − 1 : numSbCoeff − 1; n >= 0; n− − ) { | |
|     xC = ( xS << log2SbSize ) + *ScanOrder* | |
|     [ *log2SbSize* ][ *log2SbSize* ][ *n* ][ 0 ] | |
|     yC = ( yS << log2SbSize ) + *ScanOrder* | |
|     [ *log2SbSize* ][ *log2SbSize* ][ *n* ][ 1 ] | |
|     if( coded_sub_block_flag[ xS ][ yS ] && | |
|     ( n > \|\| 0 !inferSbDcSigCoeffFlag ) ) { | |
|       sig_coeff_flag[ xC ][ yC ] | ae(v) |
|       if( sig_coeff_flag[ xC ][ yC ] ) | |
|         inferSbDcSigCoeffFlag = 0 | |
|     } | |
|     if( sig_coeff_flag[ xC ][ yC ] ) { | |
|       numSigCoeff++ | |
|       par_level_flag[ n ] | ae(v) |
|       rem_abs_gt1_flag[ n ] | ae(v) |
|       if( lastSigScanPosSb = = −1 ) | |
|         lastSigScanPosSb = n | |
|       firstSigScanPosSb = n | |
|     } | |
|     AbsLevelPass1[ xC ][ yC ] = | |
|       sig_coeff_flag[ xC ][ yC ] + par_level_flag[ n ] + 2 * rem_abs_gt1_flag[ n ] | |
|     if( dep_quant_enabled_flag ) | |
|       QState = QStateTransTable[ QState ] | |
|       [ par_level_flag[ n ] ] | |
|   } | |
|   for( n = numSbCoeff − 1; n >= 0; n− − ) | |
|     if( rem_abs_gt1_flag[ n ] ) | |
|       rem_abs_gt2_flag[ n ] | ae(v) |
|   for( n = numSbCoeff − 1; n >= 0; n− − ) { | |
|     xC = ( xS << log2SbSize ) + *ScanOrder* | |
|     [ *log2SbSize* ][ *log2SbSize* ][ *n* ][ 0 ] | |
|     yC = ( yS << log2SbSize ) + *ScanOrder* | |
|     [ *log2SbSize* ][ *log2SbSize* ][ *n* ][ 1 ] | |
|     if( rem_abs_gt2_flag[ n ] ) | |
|       abs_remainder[ n ] | |
|     AbsLevel[ xC ][ yC ] = AbsLevelPass1 | |
|       [ xC ][ yC ] + 2 * | |
|       ( rem_abs_gt2_flag[ n ] + | |
|       abs_remainder[ n ] ) | |
|   } | |
|   if( dep_quant_enabled_flag \|\| | |
| !sign_data_hiding_enabled_flag ) | |
|     signHidden = 0 | |
|   else | |
|     signHidden = ( lastSigScanPosSb − firstSigScanPosSb > 3 ? 1 : 0 ) | |
|   for( n = nnmSbCoeff − 1; n >= 0; n− − ) { | |
|     xC = ( xS << log2SbSize ) + *ScanOrder* | |
|     [ *log2SbSize* ][ *log2SbSize* ][ *n* ][ 0 ] | |
|     yC = ( yS << log2SbSize ) + *ScanOrder* | |
|     [ *log2SbSize* ][ *log2SbSize* ][ *n* ][ 1 ] | |
|     if( sig_coeff_flag[ xC ][ yC ] && | |
|     ( !signHidden \|\| ( n != firstSigScanPosSb ) ) ) | |
|       coeff_sign_flag[ n ] | ae(v) |
|   } | |
|   if( dep_quant_enabled_flag ) { | |
|     QState = startQStateSb | |
|     for( n = numSbCoeff − 1; n >= 0; n− − ) { | |
|       xC = ( xS << log2SbSize ) + | |

-continued

| | Descriptor |
|---|---|
| ScanOrder [ log2SbSize ] | |
| [ log2SbSize ][ n ][ 0 ] | |
| yC = ( yS << log2SbSize ) + | |
| ScanOrder [ log2SbSize ] | |
| [ log2SbSize ][ n ][ 1 ] | |
| if( sig_coeff_flag[ xC ][ yC ] ) | |
| TransCoeffLevel[ x0 ][ y0 ][ cIdx ][ xC ] | |
| [ yC ] = ( 2 * AbsLevel[ xC ][ yC ] − | |
| ( QState > 1 ? 1 : 0 ) ) * | |
| ( 1 − 2 * coeff_sign_flag[ n ] ) | |
| QState = QStateTransTable | |
| [ QState ][ par_level_flag[ n ] ] | |
| } else { | |
| sumAbsLevel = 0 | |
| for( n = numSbCoeff − 1; n >= 0; n− − ) { | |
| xC = ( xS << log2SbSize ) + | |
| ScanOrder [ log2SbSize ] | |
| [ log2SbSize ][ n ][ 0 ] | |
| yC = ( yS << log2SbSize ) + | |
| ScanOrder [ log2SbSize ] | |
| [ log2SbSize ][ n ][ 1 ] | |
| if( sig_coeff_flag[ xC ][ yC ] ) { | |
| TransCoeffLevel[ x0 ][ y0 ][ cIdx ][ xC ] | |
| [ yC ] = AbsLevel[ xC ][ yC ] * | |
| (1 − 2 * coeff_sign_flag[ n ] ) | |
| if( signHidden ) { | |
| sumAbsLevel += AbsLevel[ xC ][ yC ] | |
| if( ( n = = firstSigScanPosSb ) | |
| && ( sumAbsLevel % 2 ) = = 1 ) ) | |
| TransCoeffLevel[ x0 ][ y0 ] | |
| [ cIdx ][ xC ][ yC ] = | |
| −TransCoeffLevel[ x0 ][ y0 ] | |
| [ cIdx ][ xC ][ yC ] | |
| } | |
| } | |
| } | |
| } | |
| } | |
| if( tu_mts_flag[ x0 ][ y0 ] && ( cIdx = = 0 ) ) | |
| mts_idx[ x0 ][ y0 ][ cIdx ] | ae(v) |
| } | | tu_coeffscan_type specifies the coefficient scanning type selected from, for example, diagonal, horizontal and vertical scan for a transform block. The values of tu_coeffscan_type can be 0, 1 or 2, which may represent diagonal (0), horizontal (1) and vertical (2) respectively. In a variant, tu_coeffscan_type specifies the coefficient scanning type/pattern selected from another set of scan patterns that may comprise scan pattern different from diagonal, horizontal and vertical scan patterns.

ScanOrder specifies the scanning order array which generates the position of the coefficient in scanning order. For each scanning type, the ScanOrder array is initialized differently, and obtained by calling function getScanOrder( ).

In another variant, additional adaptive scanning orders are defined which are different from the conventional diagonal, horizontal and vertical scanning orders. To this aim, specific vertical and horizontal scanning orders are designed for rectangular blocks. The design of the adaptive scanning order is based on zig-zag scanning order, as shown in FIG. 7. The specific vertical and horizontal scanning orders are designed so that more coefficients along the longest dimension are compacted together than along the shortest dimension in the scanning order. According to this variant, the scan step size along the longest dimension $Step_L$ will be a multiple number of the scan step size along the shortest dimension $Step_S$ (usually $Step_S=1$ as default). A scan step size is the distance interval between the first coefficient to the last coefficient along one dimension before scanning coefficients along another dimension as illustrated on FIG. 8. This multiple number is related to a ratio between the longest dimension $Size_L$ and the shortest dimension Size s of the coding block as defined below:

$$Step_L = \left(\frac{Size_L}{Size_S} - 1\right) * Step_S$$

Figure 8:
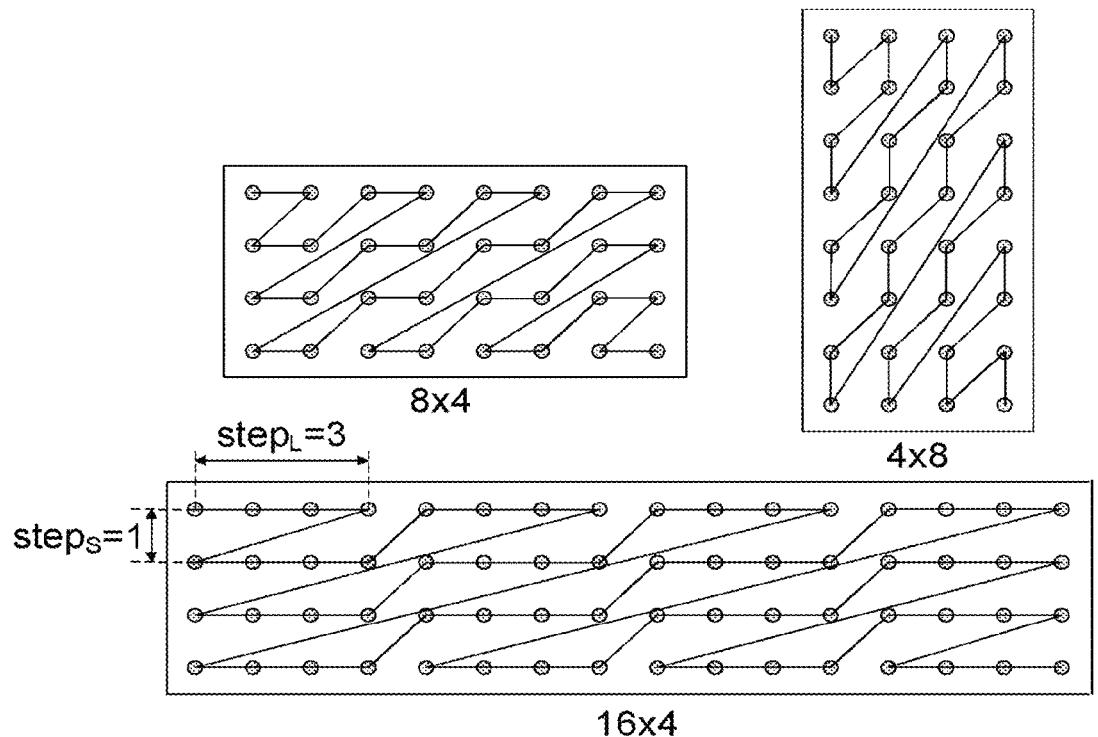
FIG. 8 illustrates various scan patterns for rectangular blocks according to one embodiment.

Some examples of proposed adaptive zig-zag scanning orders for rectangular blocks with size 8×4, 4×8 and 16×4 are given in FIG. 8.

As mentioned before, intra blocks can select scan patterns based on the intra prediction mode of this block when MDCS is activated. One limitation of MDCS or of current algorithms is that no adaptive scanning order scheme is defined for inter blocks. Diagonal scan pattern is the only scan pattern used with Inter blocks. A second embodiment proposes a general adaptive scanning order scheme for inter blocks related to prediction tool used.

Figure 9:
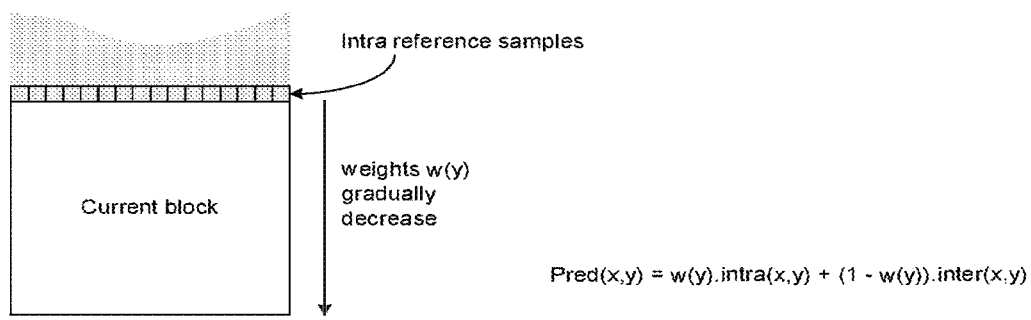
FIG. 9 depicts a multi-hypothesis prediction block in case of inter and intra modes combination.
Figure 10:
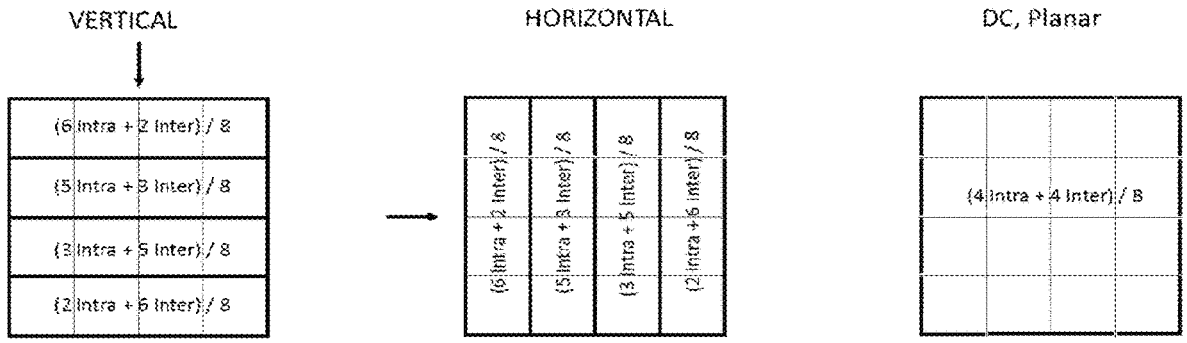
FIG. 10 illustrates various weighting for multi-hypothesis intra-inter prediction block for different intra prediction directions.

The new video codec VTM-3 implements an increased number of inter coding tools to improve the coding efficiency, e.g. Multi-hypothesis prediction (MH). The general concept of MH is to combine an inter prediction performed in merge mode with an intra prediction mode or with another inter prediction mode (e.g. uni-prediction AMVP, skip and merge). In merge mode, a list of merge candidates (reference index, motion values) is built and a merge index identifying one candidate is signaled. Motion information of a block in merge mode is then derived from the candidate identified by the merge index and used for the motion compensated prediction. In inter-intra MH, the final prediction is a weighted average of the merge indexed prediction and the prediction generated by the intra prediction mode, where different weights are applied depending on the combinations as shown in FIG. 9. The current block is split into 4 equal-area regions. The weights gradually decrease as the region is far from the intra reference samples. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)= (2, 6), will be applied to a corresponding region. Examples for intra vertical/horizontal direction prediction and intra DC/planar prediction used in multi-hypothesis are depicted in FIG. 10.

According to the second embodiment, adaptive scanning order is extended to inter blocks depending on the prediction tool (e.g. whether it uses some specific inter prediction tools such as MH, OBMC, triangular prediction, etc). For multi-hypothesis prediction blocks, adaptive scanning order is used.

In a first variant, for multi-hypothesis inter-intra prediction blocks, MDCS is reused regardless of block sizes. Vertical scanning is applied in the case where the intra prediction mode is horizontal. Vice versa, horizontal scanning is used for vertical intra prediction modes.

In a second variant, for multi-hypothesis prediction blocks (i.e. either inter-intra or inter-inter), the best scanning order is selected by exhaustive search among a set of scan patterns, e.g. the conventional diagonal, horizontal and vertical scan patterns. The exhaustive search may be also done among another set of scan patterns and is not limited to the above list. The best scanning order for a block is selected based on RD estimation and signaled to a decoder by encoding the additional syntax element tu_coeffscan_type as indicated in the syntax Table.

Figure 11:
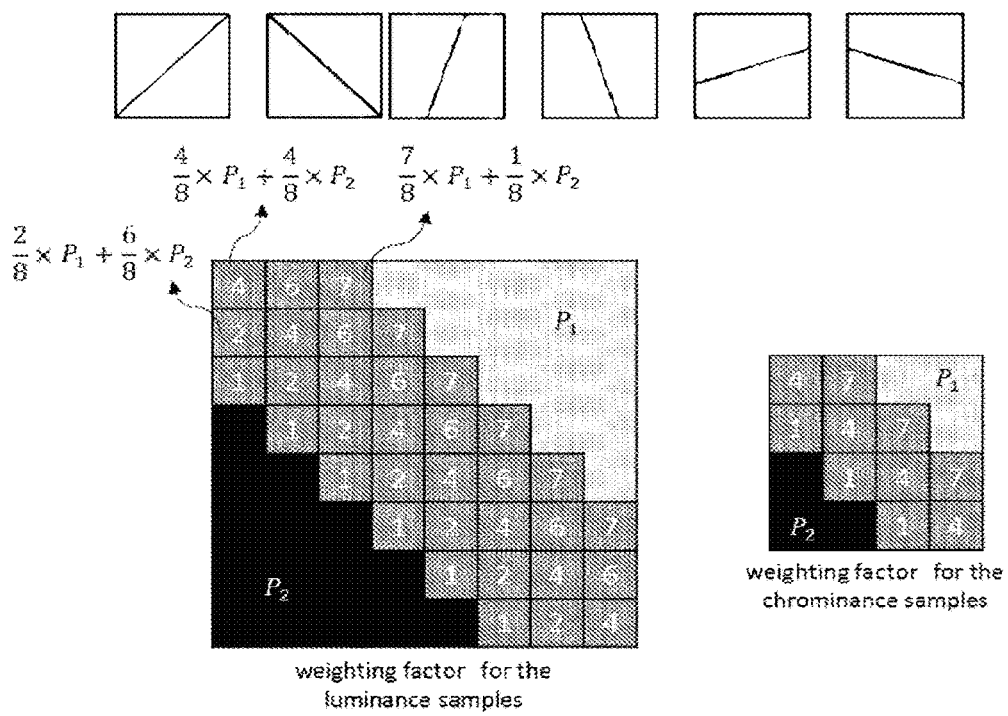
FIG. 11 depicts a block partitioned by a diagonal split line and associated weighting to the diagonal edge.

A geometric (e.g. triangular) mode is defined that allows more flexibility for partitioning a picture into blocks before coding. On top of FIG. 11, various triangular splits are depicted. The block is split using a diagonal split line. Additional coding performance may be obtained by performing weighting of the two predictors P1 and P2 on the frontiers (grey area on FIG. 11, bottom). The triangular prediction unit mode is only applied to a CU which block size is larger than or equal to 8×8, and its coding prediction mode is either skip or merge mode. The triangular prediction mode benefits a lot for scenarios where objects move differently in the same block, or an oblique line divides a block into 2 partitions. Therefore, triangular prediction mode is often applied for a block which is not flat. After transform and quantization, low- and high-frequency transform coefficients may be still too much interlaced if only diagonal scanning is used.

In a third variant, for triangular prediction blocks, the best scanning order is selected by exhaustive search among a set of scan patterns, e.g. the conventional diagonal, horizontal and vertical scan patterns. The exhaustive search may be also done among another set of scan patterns and is not limited to the above list. The best scanning order for a block is selected based on RD estimation and signaled to a decoder by encoding an additional syntax element tu_coeffscan_type as indicated in the syntax Table.

The third embodiment proposes a general adaptive scanning order scheme taking into account some relations existing between activating adaptive scanning order and the transform type applied for a block.

Multiple transform selection (MTS) is implemented in current VTM-3. According to MTS, DST-7 and DCT-8 are used in addition to DCT-2. There are separate MTS enabling flags for intra and inter at SPS level. When MTS is enabled, then a single flag is encoded/decoded to signal that DCT-2 is applied in both directions. In the case where, MTS is enabled and DCT-2 is not used in both directions, an index (MTS_Idx) of 2 bits is coded/decoded to signal the 4 pairs of horizontal and vertical transforms. For this, DCT8 and DST7 are the two possible transforms for horizontal and vertical direction.

Some of the DCT/DST transform family can be classified as increasing, decreasing and constant first basis function as in Table 2. As mentioned in Table 2, DCT-2 has a constant first basis function, DST-7 has an increasing first basis function, and DCT-8 has a decreasing first basis function. The first basis function represents basis function of the considered transform at the lowest frequency. As an example, DCT2 basis functions $T_i(j)$, i, j=0, 1, . . . , N−1 are defined as follows:

$$T_i(j) = \omega_0 \cdot \sqrt{\frac{2}{N}} \cdot \cos\left(\frac{\pi \cdot i \cdot (2j+1)}{2N}\right), \text{ where } \omega_0 = \begin{cases} \sqrt{\frac{2}{N}} & i=0 \\ 1 & i \neq 0 \end{cases}$$

The first basis function is for i=0 and is thus constant for DCT2.

As another example, DCT8 basis functions $T_i(j)$, i, j=0, 1, . . . , N−1 are defined as follows:

$$T_i(j) = \sqrt{\frac{4}{2N+1}} \cdot \cos\left(\frac{\pi \cdot (2i+1) \cdot (2j+1)}{4N+2}\right)$$

The first basis function is for i=0 and is thus decreasing for DCT8.

As another example, DST7 basis functions $T_i(j)$, i, j=0, 1, . . . , N−1 are defined as follows:

$$T_i(j) = \sqrt{\frac{4}{2N+1}} \cdot \sin\left(\frac{\pi \cdot (2i+1) \cdot (j+1)}{2N+1}\right)$$

The first basis function is for i=0 and is thus increasing for DST7.

When 2-D DCT-2 is implemented separately by performing 1-D DCT-2 twice, horizontally and vertically, the signal correlation along either the horizontal or vertical direction is capable to be captured by this separable 2-D transform. However, this 2-D DCT-2 can be sub-optimal when there exist directional edges. Therefore, different combinations of DST-7 and DCT-8 applied in horizontal and vertical directions separately are complementary for these cases.

Although after the adaptive transform such as MTS, the distribution statistics of transform coefficients present less mode-dependent characteristic, some room to avoid too much interlaced low- and high-frequency transform coefficients is still left for adaptive scanning order.

TABLE 2

| Transform | First basis Type |
| --- | --- |
| DCT1 | Constant |
| DCT2 | Constant |
| DCT3 | Decreasing |
| DCT4 | Decreasing |
| DCT5 | Constant |
| DCT6 | Constant |
| DCT7 | Decreasing |
| DCT8 | Decreasing |
| DST1 | Constant |
| DST2 | Constant |
| DST3 | Increasing |
| DST4 | Increasing |
| DST7 | Increasing |
| DST8 | Increasing |

In the third embodiment, scanning order selection is dependent on the transform type, which can also be called "transform-type dependent coefficients scanning".

In a first variant, in the case where separable transform schemes are used, the following applies:
  in the case where a transform with constant first basis function is applied on both horizontal and vertical directions for this block, diagonal scanning is applied;
  otherwise, in the case where one of the horizontal and vertical directions is not using a transform with constant first basis function, adaptive scanning order is activated for this block. To this aim, the best scanning order is selected by exhaustive search among a set of scan patterns, e.g. the conventional diagonal, horizontal and vertical scan patterns. The exhaustive search may be also done among another set of scan patterns and is not limited to the above list. The best scanning order for a block is selected based on RD estimation and signaled to a decoder by encoding the additional syntax element tu_coeffscan_type as indicated in the syntax Table.

In a second variant, in the case where MTS is used, the following applies:
  in the case where the separable 2-D DCT-2 transform is applied for this block, diagonal scanning is applied;

otherwise, in the case where DST-7 and DCT-8 are applied in horizontal and vertical directions separately for this block, adaptive scanning order is activated. To this aim, the best scanning order is selected by exhaustive search among a set of scan patterns, e.g. the conventional diagonal, horizontal and vertical scan patterns. The exhaustive search may be also done among another set of scan patterns and is not limited to the above list. The best scanning order for a block is selected based on RD estimation and signaled to a decoder by encoding the additional syntax element tu_coeffscan_type as indicated in the syntax Table.

The first, second and third embodiments may be used completely independently or may be combined. In an example, the second and third embodiments may use the new scan orders defined in the first embodiment, e.g. the ones depicted on FIG. 8. In order to select the new scan order to be used for a block, the shape of the block is required. Finally, for a rectangular block, a final scan pattern may be selected among D, H, V and the additional new scan pattern based on prediction tool or transform type as in second and third embodiment.

If an additional syntax tu_coeffscan_type, which indicates the selected scanning order among a set of scanning pattern, e.g. the diagonal, horizontal and vertical scan patterns, is applied, the context used for entropy coding/decoding it can be selected based on the block shape, the prediction tool and the transform type.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 12:
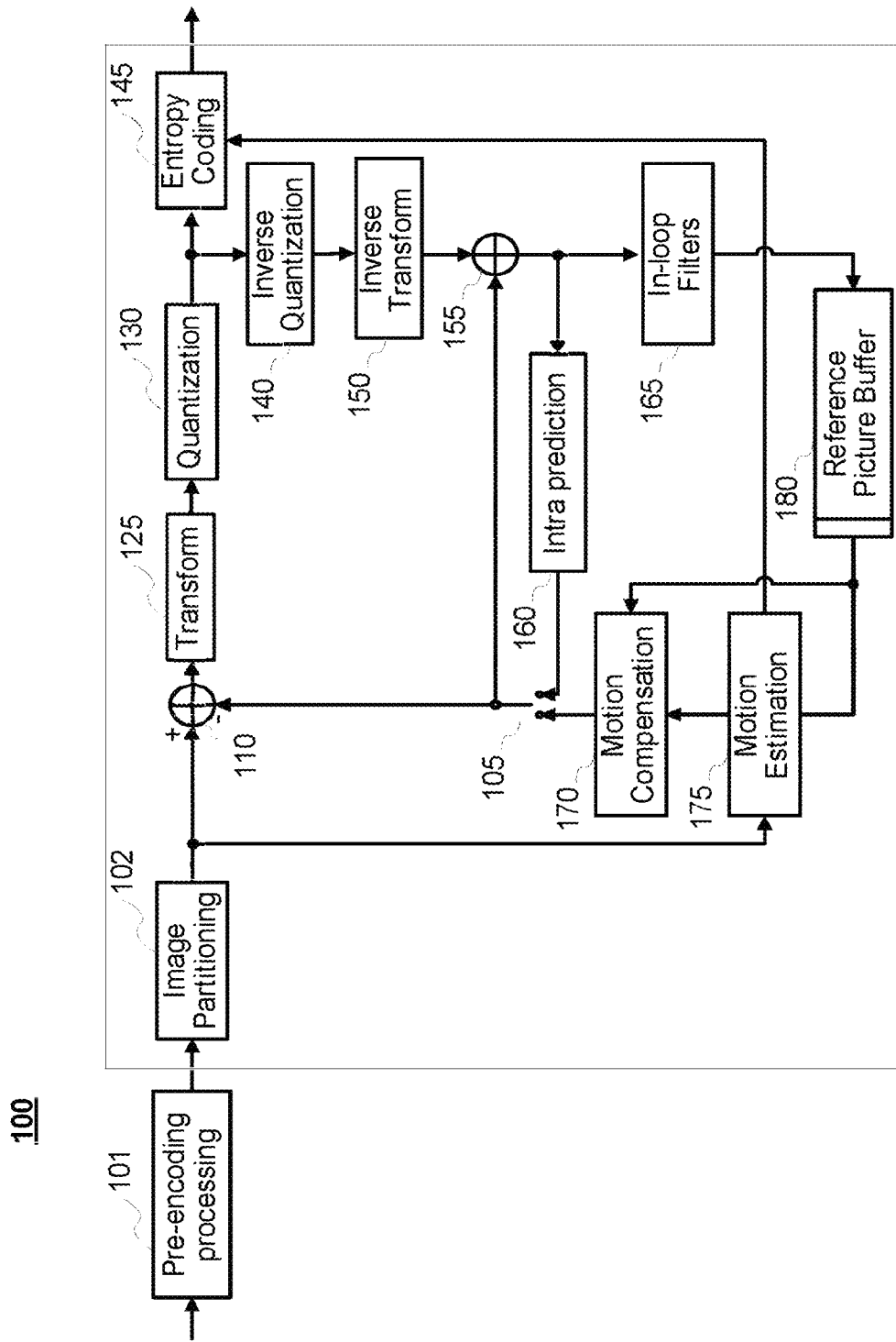
FIG. 12 illustrates a block diagram of a video encoder according to an embodiment.
Figure 13:
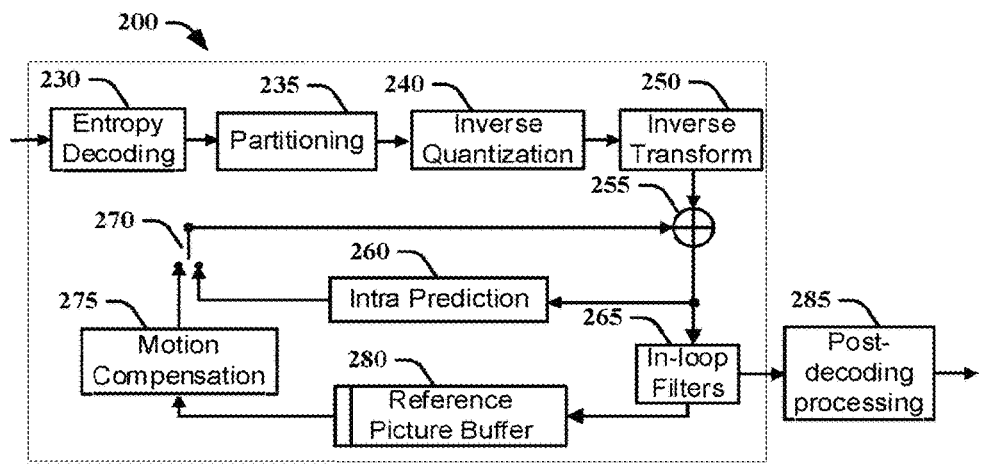
FIG. 13 illustrates a block diagram of a video decoder according to an embodiment.
Figure 14:
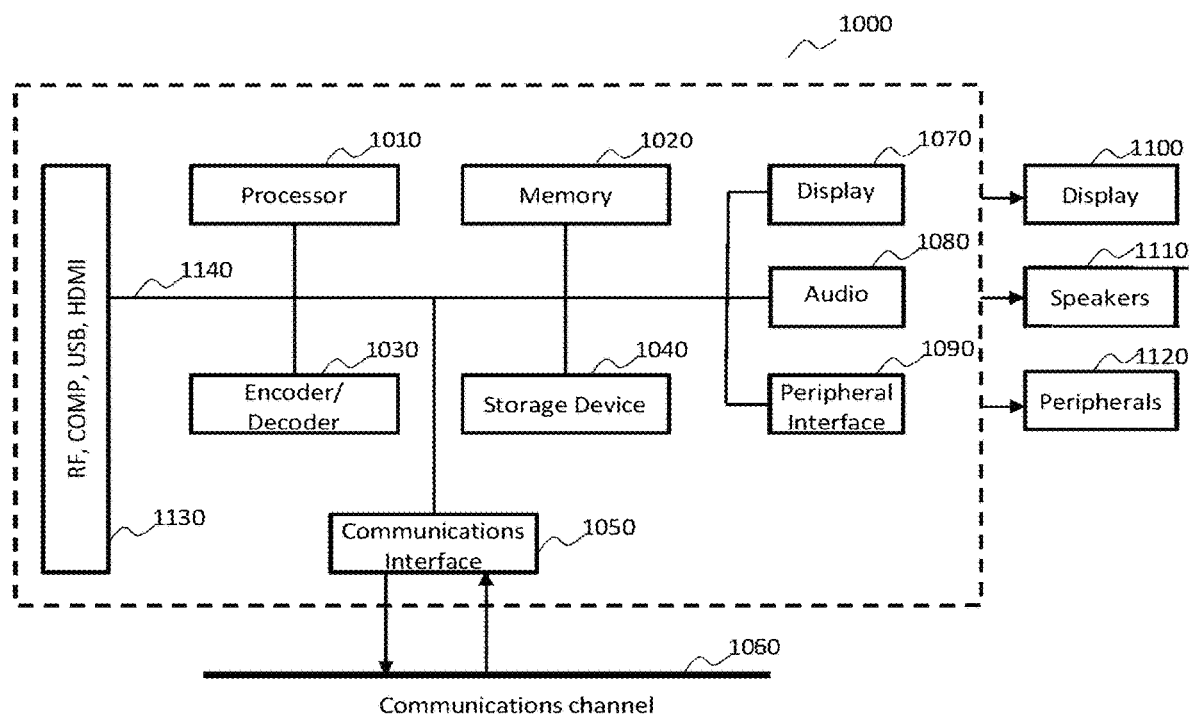
FIG. 14 illustrates a block diagram of an example of a system in which various aspects and embodiments are implemented.

The aspects described and contemplated in this application can be implemented in many different forms. FIGS. 12, 13 and 14 below provide some embodiments, but other embodiments are contemplated and the discussion of FIGS. 12, 13 and 14 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the entropy coding, and/or decoding modules (145, 230), of a video encoder 100 and decoder 200 as shown in FIGS. 12 and 13. Moreover, the present aspects are not limited to WC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the value T. The specific values are for example purposes and the aspects described are not limited to these specific values.

FIG. 12 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 13 illustrates a block diagram of a video decoder 200. In the decoder 200, a bitstream is decoded by the decoder elements as described below. Video decoder 200 generally performs a decoding pass reciprocal to the encoding pass as described in FIG. 12. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 14 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining a scan pattern for a block based on one or more of a block shape, prediction tool and transform type.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining a scan pattern for a block based on one or more of a block shape, prediction tool and transform type.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, tu_coeffscan_type, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion (RD) optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a scan pattern. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

Determining a scanning pattern for a block based on one or more of a block shape, prediction tool and transform type;

A bitstream or signal that includes one or more of the described syntax elements, or variations thereof.

Inserting in the signaling syntax elements that enable the decoder to adapt scanning order in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs adaptation of scanning order according to any of the embodiments described.

A TV, set-top box, cell phone, tablet, or other electronic device that performs adaptation of scanning order according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs adaptation of scanning order according to any of the embodiments described.

A TV, set-top box, cell phone, tablet, or other electronic device that receives (e.g. using an antenna) a signal over the air that includes an encoded image, and performs adaptation of scanning order according to any of the embodiments described.

According to a general aspect of at least one embodiment, a decoding method is presented, comprising: entropy decoding transform coefficients of a block scanned according to a scan pattern wherein the scan pattern is determined responsive to a shape of said block.

According to a general aspect of at least one embodiment, an encoding method is presented, comprising: obtaining transform coefficients of a block; and scanning said coefficients for entropy coding according to a scan pattern; wherein the scan pattern is determined responsive to a shape of said block.

According to a general aspect of at least one embodiment, a decoding apparatus is presented, comprising one or more processors configured to implement: entropy decoding transform coefficients of a block scanned according to a scan pattern wherein the scan pattern is determined responsive to a shape of said block.

According to a general aspect of at least one embodiment, an encoding apparatus is presented, comprising one or more processors configured to implement: obtaining transform coefficients of a block; and scanning said coefficients for entropy coding according to a scan pattern; wherein the scan pattern is determined responsive to a shape of said block.

According to another general aspect of at least one embodiment, a bitstream is formatted to include signal generated according to the encoding methods described above.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

In one embodiment, the scan pattern is determined responsive to whether the block is a square block, an horizontal rectangular block or a vertical rectangular block.

In one embodiment, in the case where said block is a rectangular vertical block, the coefficients are scanned according to an horizontal scan pattern and in the case where said block is a rectangular horizontal block, the coefficients are scanned according to a vertical scan pattern.

In one embodiment, in the case where a ratio between the largest dimension of said block and the shortest dimension of said block is equal or larger than a value, the coefficients are scanned according to a vertical scan pattern in the case where said block is a rectangular horizontal block and the coefficients are scanned according to an horizontal scan pattern in the case where said block is a rectangular vertical block.

In one embodiment, in the case where said block is a rectangular block, the coefficients are scanned according to a scan pattern selected by an exhaustive rate-distortion search among a set of patterns and wherein the selected scan pattern is encoded in the bitstream.

In one embodiment, in the case where a ratio between the longest dimension of said block and the smallest dimension of said block is equal or larger than another value and said block is a rectangular block, the coefficients are scanned according to a scan pattern selected by an exhaustive rate-distortion search among a set of patterns and wherein the selected scan pattern is encoded in the bitstream.

In one embodiment, in the case where said block is a rectangular block, the coefficients are scanned according to a scan pattern defined so that a scan step size along the longest dimension is larger than a scan step size along the shortest dimension.

In one embodiment, in the case where said block is a multi-hypothesis intra-inter prediction block, vertical scanning is applied in the case where the intra prediction mode is horizontal and horizontal scanning is applied in the case where the intra prediction mode is vertical.

In one embodiment, in the case where said block is a multi-hypothesis prediction block, the coefficients are scanned according to a scan pattern selected by an exhaustive rate-distortion search among a set of patterns and wherein the selected scan pattern is encoded in the bitstream.

In one embodiment, in the case where said block is triangular prediction block, the coefficients are scanned according to a scan pattern selected by an exhaustive rate-distortion search among a set of patterns and wherein the selected scan pattern is encoded in the bitstream.

In one embodiment, obtaining transform coefficients of a block comprises transforming residuals of a block using at least one transform to obtain transform coefficients and the scan pattern is determined responsive to a type of said transform, wherein the type of a transform is defined by its low frequency being constant, increasing or decreasing.

In one embodiment, in the case where a transform with constant low frequency is applied both horizontally and vertically, the coefficients are scanned according to a diagonal scan pattern and wherein in the case where one of horizontal and vertical transforms is not a transform with constant low frequency, the coefficients are scanned according to a scan pattern selected by an exhaustive rate-distortion search among a set of patterns and wherein the selected scan pattern is encoded in the bitstream.

In one embodiment, in the case where vertical and horizontal transforms are DCT-2, the coefficients are scanned according to a diagonal scan pattern and wherein in the case where vertical and horizontal transforms are selected among DST-7 and DCT-8 transforms, the coefficients are scanned according to a scan pattern selected by an exhaustive rate-distortion search among a set of patterns and wherein the selected scan pattern is encoded in the bitstream.

The invention claimed is:

1. An encoding method comprising:
applying a transform function to a residual block of a current block of samples to obtain transform coefficients; and
scanning the transform coefficients according to a scan order for entropy coding;
wherein, responsive to a first basis function of the transform function at a lowest frequency is constant, the transform coefficients are scanned according to a first scan order, and otherwise, the transform coefficients are scanned according to a second scan order different from the first scan order.

2. The method of claim 1, wherein a diagonal scanning order is applied responsive to the transform function is a separable 2-D DCT-2.

3. The method of claim 1, wherein the second scan order is selected by an exhaustive rate distortion estimation among a set of scan orders comprising scan orders different from the first scan order and wherein the selected second scan order is encoded in video data representing at least the current block.

4. A non-transitory information storage medium storing program code instructions for implementing the method according to claim 1.

5. An encoding apparatus comprising:
one or more processors configured to perform:
applying a transform function to a residual block of a current block of samples to obtain transform coefficients; and
scanning the transform coefficients according to a scan order for entropy coding;
wherein, responsive to a first basis function of the transform function at a lowest frequency is constant, the transform coefficients are scanned according to a first scan order, and otherwise, the transform coefficients are scanned according to a second scan order different from the first scan order.

6. The encoding apparatus of claim 5, wherein a diagonal scanning order is applied responsive to the transform function is a separable 2-D DCT-2.

7. The encoding apparatus of claim 5, wherein the second scan order is selected by an exhaustive rate distortion estimation among a set of scan orders comprising scan orders different from the first scan order and wherein the selected second scan order is encoded in video data representing at least the current block.

8. A decoding method comprising:
entropy decoding transform coefficients of a current block ordered according to a scan order; and
obtaining a residual block for the current block by performing a transform on the transform coefficients;
wherein responsive to a first basis function of the transform at a lowest frequency is constant, the transform coefficients are scanned according to a first scan order, and otherwise, the transform coefficients are scanned according to a second scan order different from the first scan order.

9. The method of claim 8, wherein a diagonal scanning order is applied responsive to the transform is a separable 2-D DCT-2.

10. The method of claim 8, wherein the scanning order further depends on a shape of the current block or on a prediction tool used.

11. The method of claim 8, wherein the second scan order is decoded from video data representing at least the current block.

12. A non-transitory information storage medium storing program code instructions for implementing the method according to claim 11.

13. A decoding apparatus comprising:
one or more processors configured to perform:
entropy decoding transform coefficients of a current block ordered according to a scan pattern; and obtaining a residual block for the current block by performing a transform on the transform coefficients;

wherein responsive to a first basis function of the transform at a lowest frequency is constant, the transform coefficients are scanned according to a first scan order, and otherwise, the transform coefficients are scanned according to a second scan order different from the first scan order.

14. The decoding apparatus of claim 13, wherein a diagonal scanning order is applied responsive to the transform function is a separable 2-D DCT-2.

15. The decoding apparatus of claim 13, wherein the second scan order is decoded from video data representing at least the current block.

16. The decoding apparatus of claim 13, wherein the scanning order further depends on a shape of the current block or on a prediction tool used.

* * * * *